US012774936B2

(12) United States Patent
Ashrafi et al.

(10) Patent No.: US 12,774,936 B2
(45) Date of Patent: Oct. 27, 2026

(54) FULL COHERENT OPTICAL TIME-DOMAIN REFLECTOMETRY (FC-OTDR) WITH INTRUSION DETECTION CAPABILITY OVER DATA TRANSMISSION FIBER

(71) Applicant: Infinera Corporation, San Jose, CA (US)

(72) Inventors: Reza Ashrafi, Ottawa (CA); Sung Han Chung, Kanata (CA); Suet Yuen, Kanata (CA); Manish Sharma, Morgan Hill, CA (US); Yan Han, Richardson, TX (US)

(73) Assignee: Infinera Corporation

( * ) Notice: Subject to any disclaimer, the term of this patent is extended or adjusted under 35 U.S.C. 154(b) by 116 days.

(21) Appl. No.: 18/807,191

(22) Filed: Aug. 16, 2024

(65) Prior Publication Data

US 2026/0049897 A1 Feb. 19, 2026

Related U.S. Application Data

(60) Provisional application No. 63/533,278, filed on Aug. 17, 2023.

(51) Int. Cl.
*H04B 10/071* (2013.01)
*G01M 11/00* (2006.01)

(52) U.S. Cl.
CPC .... *G01M 11/3145* (2013.01); *G01M 11/3109* (2013.01); *H04B 10/071* (2013.01); *G01M 11/3136* (2013.01)

(58) Field of Classification Search
CPC ......... G01M 11/3145; G01M 11/3109; G01M 11/3136; H04B 10/071
See application file for complete search history.

(56) References Cited

U.S. PATENT DOCUMENTS

2008/0013079 A1* 1/2008 Bottman ............ G01M 11/3145 356/73.1
2021/0336695 A1* 10/2021 Yoffe .................. H04B 10/073

FOREIGN PATENT DOCUMENTS

EP 0315271 A1 * 5/1989 ........ G01M 11/3109
EP 4020840 A1 * 6/2022 ........... H04B 10/071

* cited by examiner

*Primary Examiner* — Maurice C Smith

(57) ABSTRACT

The proposed full-coherent optical time domain reflectometry (FC-OTDR) solution extracts full optical phase and state of the polarization (SOP) information for fiber intrusion detection by constructing a continuous reflected SOP from each point of the fiber length. Intrusion location is then extracted from the resulting SOP change patterns.

14 Claims, 8 Drawing Sheets

108

400

FULL COHERENT OPTICAL TIME-DOMAIN REFLECTOMETRY (FC-OTDR) WITH INTRUSION DETECTION CAPABILITY OVER DATA TRANSMISSION FIBER

BACKGROUND

The present disclosure is directed toward a fiber optic communication network generally, and a method and apparatus for detecting a break in a fiber provided in such network, in particular.

SUMMARY

In some implementations, an optical time-domain reflectometry (OTDR) system includes a coherent optical transceiver configured to: generate a multi-tone optical signal via a coherent modulator; transmit the multi-tone optical signal through a transmission port into a fiber under test; receive a backscattered optical signal from the fiber under test through a reception port; and an intradyne coherent receiver coupled to the reception port, configured to: split the backscattered optical signal into two orthogonal polarization components; convert each polarization component into electrical in-phase and quadrature components via balanced photodiodes; and digitize the electrical in-phase and quadrature components for signal processing including ultra-fast averaging to detect intrusions within the fiber under test.

DETAILED DESCRIPTION

Figure 1:
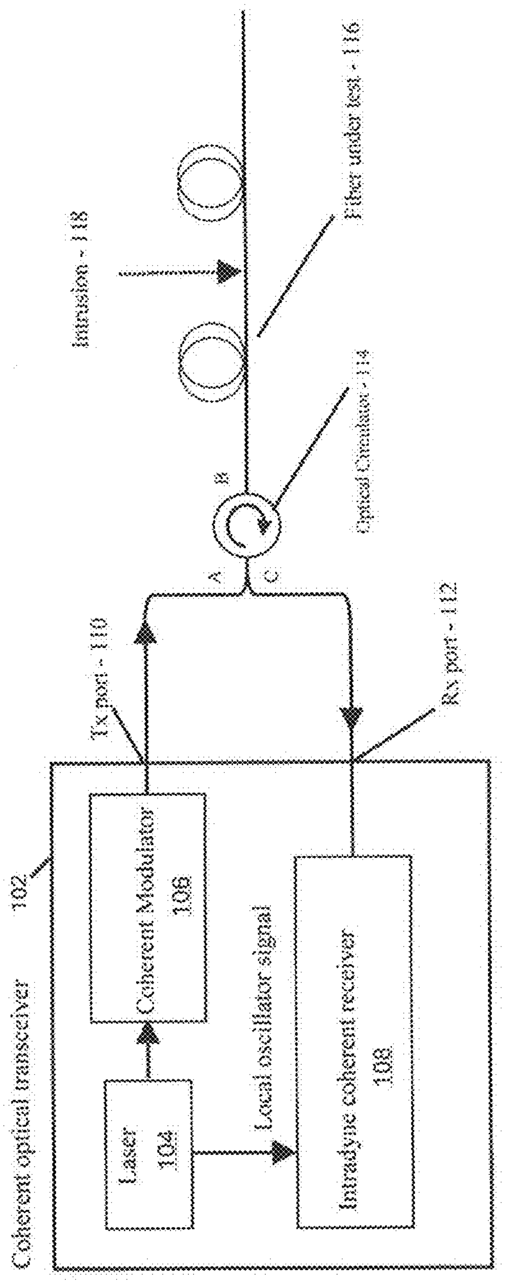
FIG. 1. shows a block diagram of a coherent optical transceiver consistent with an aspect of the present disclosure.

OTDR is a common technique for measuring the optical fiber length, attenuation and profile events (PEs) e.g. fiber cuts, insertion loss of connectors, splices etc. Deployed optical fiber networks are exposed to various environmental events causing fiber cuts or insertion loss increase, affecting the data transmission due to construction works, fire, natural disasters, stray animals, intentional damage, etc. Current state of the art OTDRs over typical data transmission fiber span length, in the range of 100 km, can only detect static but not dynamic PEs due to the required averaging time that is in the range of 1 min. However, detecting dynamic PEs or intrusions are important for security, maintenance, fiber cut prediction/prevention, and fiber sensing applications. Intrusions by something/someone directly/indirectly hitting the fiber cable are referred to as dynamic PEs which are transient in nature that will disappear after a short time. The proposed FC-OTDR solution can detect both static PEs and intrusions with their locations along the fiber length.

The most deployed OTDR type in optical fiber networks is referred to as noncoherent-OTDR (NC-OTDR), which operates by injecting probe optical pulses into the fiber under test and successively detecting the Rayleigh backscattered optical power within every pulse's round-trip period. Averaging between several periods is necessary to achieve less noisy OTDR trace. Other OTDR approaches, herein referred to as semi-coherent OTDR (SC-OTDR), have also been developed. SC-OTDR has improved noise reduction vs. NC-OTDRs, by exploiting the coherent optical beating between the Rayleigh backscattered signal and an optical local oscillator. Better noise reduction means reduced averaging and therefore faster to achieve same OTDR trace quality for PE monitoring. Another SC-OTDR approach used to achieve better noise reduction is based on frequency-division multiplexing (FDM-SC-OTDR). This methodology has two major limitations towards enabling intrusion detection capability:

Limitation A: FDM-SC-OTDR uses a single photodetector; hence it cannot extract the optical phase and state of polarization (SOP) information for intrusion detection.

Limitation B: FDM-SC-OTDR has limited averaging speed for a given level of noise reduction or signal to noise ratio (SNR). The averaging speed limitation is due to the employed complex optical hardware for multiple tone generation, which imposes a limitation on the maximum feasible number of tones (Ntn) generation e.g. Ntn=40. Generating Ntn number of tones reduces the OTDR averaging by Ntn times as compared to single tone operation. Therefore, limiting the number of tones causes the averaging speed limitation. For generation of multiple tones, FDM-SC-OTDR uses a phase modulator. Driving the phase modulator by an electrical tone voltage with f1 frequency generates a tone with frequency f1, but also generates higher order harmonics having frequencies 2×f1, 3×f1, etc. These unwanted harmonics induce crosstalk between different tones, such that each tone induces noise in other tones and reduces' the effectiveness of the multi-tone operation. To eliminate the harmonic crosstalk between different tones, the selected tone frequencies should not be multiples of one another. Accordingly, the number of tones that can be generated within the bandwidth capability of the tone generation circuit is limited.

Recently, other non-OTDR SOP-based intrusion detection schemes have been developed using transceiver line modules. In these approaches, intrusion is detected based on the channel data stream SOP change between the transmitter on one end and the receiver on the other end of a transmission fiber. Unlike the OTDR reflected signal measurement, the transmitted signal from one end to another end of the fiber lacks the fiber time-to-space mapping required for localization. Therefore, in these non-OTDR approaches, SOP change or intrusion "location" cannot be extracted. Localization results have been achieved by exploiting additional reflected signal from high-loss loopbacks (HLL) at each repeater. However, such localization cannot resolve distances less than the repeater spacing, typically in the range of 80 km. To date, HLL localization has not been used for event location detection, even when combined with other data from other neighboring fibers.

Note that the non-data transmission fiber sensing techniques, such as polarization OTDR methods, can detect periodic/vibration only events in short distance fibers, e.g. <2 km fiber length, but cannot be implemented in a data transmission fiber with longer lengths, e.g., 100 km.

The proposed FC-OTDR solution extracts full optical phase and state of the polarization (SOP) information for fiber intrusion detection. Consistent with the present disclosure, the proposed FC-OTDR overcomes the above-noted shortcomings of conventional approaches by constructing a continuous reflected SOP from each point of the fiber length. Intrusion location is then extracted from the resulting SOP change patterns.

This is realized by deploying optical intradyne coherent receiver at the OTDR receiver (Rx) combined with the multi-tone signal generation by the coherent modulator at the OTDR transmitter (Tx). The generated multi-tone signal enables an ultrafast averaging process that is required for SOP change tracking along the fiber length and intrusion detection.

By optimizing the design of the tone generation circuitry, the proposed FC-OTDR solution can provide orders of magnitude faster averaging speed than the conventional OTDR technology. For 100 km fiber span length, the proposed solution constructs a real-time trace in 60 ms vs. other approaches that takes >1 min. Note that if the averaging speed is slower than the intrusion induced SOP event time, the OTDR SOP trace cannot be constructed and correspondingly, the fiber intrusion event cannot be detected. The OTDR feature employs full optical phase as well as SOP extraction and tracking enabled by ultrafast averaging. This unique capability enables unprecedented SOP events "location" extraction due to intrusions over the data transmission fiber.

As discussed in greater detail below, limitations A and B noted above may be overcome in the proposed FC-OTDR approach disclosed herein. In particular, FC-OTDR, consistent with the present disclosure, employs a coherent modulator that eliminates higher order harmonics by modulating both amplitude and phase of the laser output. In one example, the modulator includes a nested Mach-Zehnder modulator biased at the null-point to thereby restrict the modulation depth to the linear region of the modulator. As a result of such biasing, the number of generated tones is not limited, such that ultrafast SOP tracking for intrusion detection can be realized.

Reference will now be made in detail to the present embodiments of the present disclosure, examples of which are illustrated in the accompanying drawings. In general, the same reference numbers will be used throughout the drawings to refer to the same or like parts.

FIG. 1 depicts an optical time-domain reflectometry (OTDR) system designed for intrusion detection within optical fibers. The system comprises a coherent optical transceiver (102) that includes a laser (104) for generating an initial optical signal. This signal is subsequently modulated by a coherent modulator (106), which, in one example, includes a nested Mach-Zehnder modulator configured to produce a multi-tone optical signal.

The multi-tone optical signal is transmitted through a transmission port (Tx port, 110) into a fiber under test (116). An optical circulator (114) is employed to direct the multi-tone optical signal from the transmission port (110) to the fiber under test (116) via circulator ports A and B. A backscattered signal resulting from disturbances, such as intrusions (118) is input to port B of circulator 114 and output from port C of the circulator to a reception or receiver port (Rx port, 112) of the intradyne coherent receiver (108).

Figure 2:
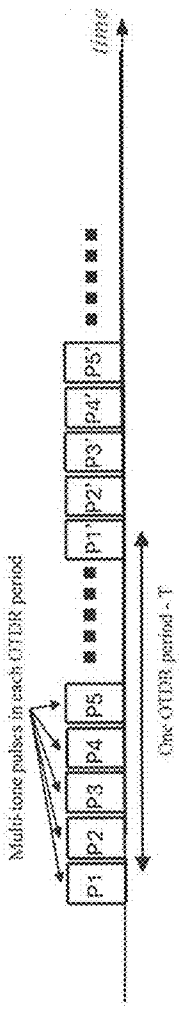
FIG. 2 shows multi-tone pulses consistent with an additional aspect of the present disclosure.

FIG. 2 shows an example of a periodic pulse train output from Tx port 110 including pulses P1 to P5 transmitted during an OTDR period T. Following OTD period T a successive train of pulses including pulses P1' to P5' is transmitted from Tx port 110 to fiber under test 116. In one example, the pulses output from Tx port 110 are multi-tone pulses, each having a different modulation frequency.

Figure 3:
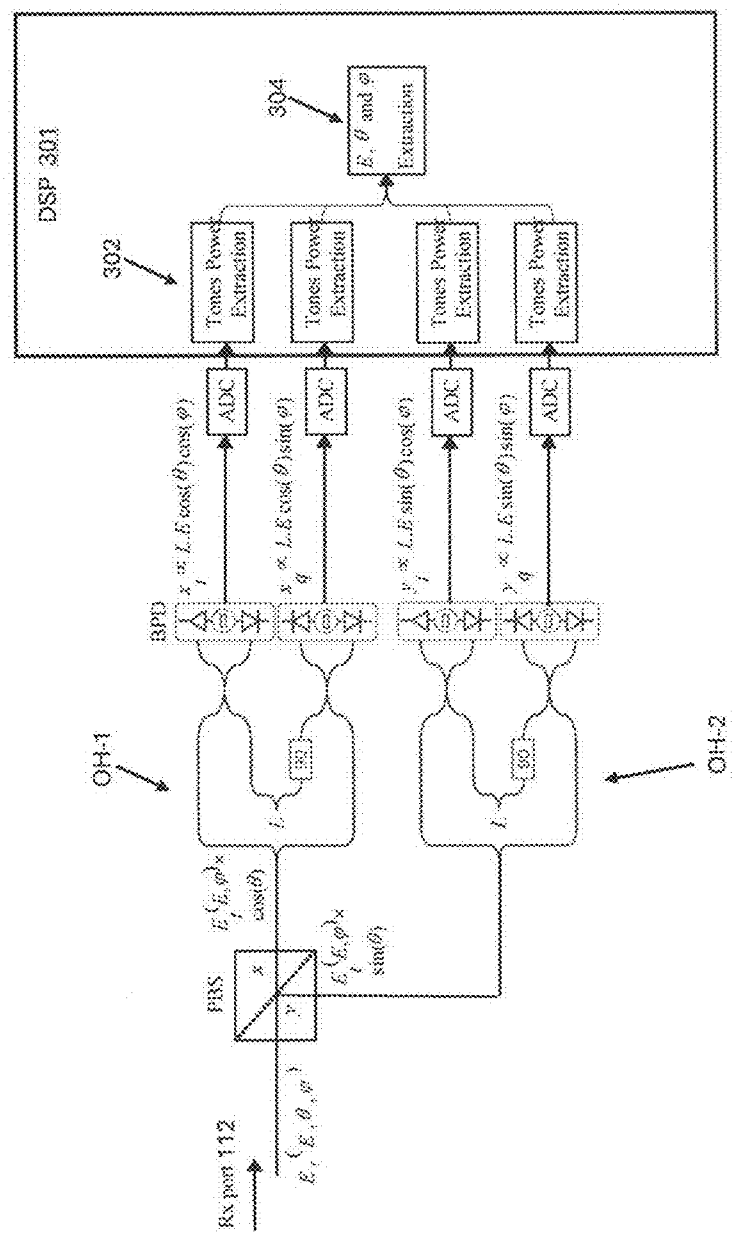
FIG. 3 shows a block diagram of an intradyne coherent receiver consistent with a further aspect of the present disclosure.

FIG. 3 shows intradyne coherent receiver (ICR) 108 in greater detail. The backscattered optical signal received at Rx input port 112 has an associated time-domain electric field complex envelope, Et, with properties of E, θ, and φ respectively written as Et(E, θ, φ); where E is the electric field envelope amplitude. θ is the polarization angle of the received or Rx signal with respect to the polarization beam splitter (PBS) x-axis, and φ is the optical phase of the Rx signal with respect to L, where L is the electric field envelope amplitude of the optical signal output. from laser 102, which, in this example constitutes a local oscillator signal.

As further shown in FIG. 3, a polarization beam splitter (PBS) receives Et and outputs x (Et(E,φ)×cos(θ)) and y (Et(E,φ)×sin(θ)) polarization components thereof. The x polarization component is provided to optical hybrid circuitry OH-1, which mixes the x polarization component with a first portion of the local oscillator signal output from laser 102, and the y polarization component is supplied to optical hybrid circuitry OH-2, which mixes the y polarization component with a second portion of the local oscillator signal. Put another way, optical hybrid circuit OH-1 and OH-2 decompose the x and y polarization components into two in-phase and quadrature components denoted by i and q. The resulting mixing products generated by OH-1 and OH-2 (i.e., the i and q components associated with each polarization x and y) are provided to balanced photodiodes (BPDs), which convert the mixing products to electric currents referred to as xi, xq, yi and yq, correspondingly. These four electric currents can be expressed as indicated below:

$$x_i \propto L \cdot E\cos(\theta)\cos(\varphi) \tag{1}$$

$$x_q \propto L \cdot E\cos(\theta)\sin(\varphi) \tag{2}$$

$$y_i \propto L \cdot E\sin(\theta)\cos(\varphi) \tag{3}$$

$$x_q \propto L \cdot E\sin(\theta)\sin(\varphi) \tag{4}$$

These four electric currents, $x_i$, $x_q$, $y_i$, and $y_q$ are sampled by analog to digital convertors (ADCs) as shown in FIG. 3. The ADC samples are then processed by the FPGA to extract the power of each tone. The notation $x_{i,n}$ refers to the nth tone power of $x_i$. The tone powers also include the relative sign between the i and q quadrature. For each tone, the total tone power $P_n$, each polarization power $P_{x,n}$ and $P_{y,n}$, polarization angle $\theta_n$ and each polarization optical phase $\varphi_{x,n}$ and $\varphi_{y,n}$, are extracted according to the following equations:

$$nth\text{ tone power: } P_n = P_{x,n} + P_{y,n} \tag{5}$$

$$nth\text{ tone } x\text{-polarization power: } P_{x,n} = x_{i,n}^2 + x_{q,n}^2 \tag{6}$$

-continued $$nth\text{ tone }y\text{-polarization power: }P_{y,n}=y_{i,n}^2+y_{q,n}^2 \quad (7)$$

$$nth\text{ tone polarization angle: }\theta_n=\tan^{-1}\left(\frac{P_{y,n}}{P_{x,n}}\right) \quad (8)$$

$$nth\text{ tone }x\text{-polarization optical phase: }\varphi_{x,n}=\tan^{-1}\left(\frac{x_{q,n}}{x_{i,n}}\right) \quad (9)$$

$$nth\text{ tone }y\text{-polarization optical phase: }\varphi_{y,n}=\tan^{-1}\left(\frac{y_{q,n}}{y_{i,n}}\right) \quad (10)$$

In addition, the SOP Stokes parameters for the nth tone; $S_{1,n}$, $S_{2,n}$, and $S_{3,n}$, can be expressed as below:

$$S_{1,n}=P_{x,n}-P_{y,n} \quad (11)$$

$$S_{2,n}=2\cdot\sqrt{P_{x,n}\cdot P_{y,n}}\cdot\cos(\varphi_{x,n}-\varphi_{y,n}) \quad (12)$$

$$S_{3,n}=2\cdot\sqrt{P_{x,n}\cdot P_{y,n}}\cdot\sin(\varphi_{x,n}-\varphi_{y,n}) \quad (13)$$

Figure 4:
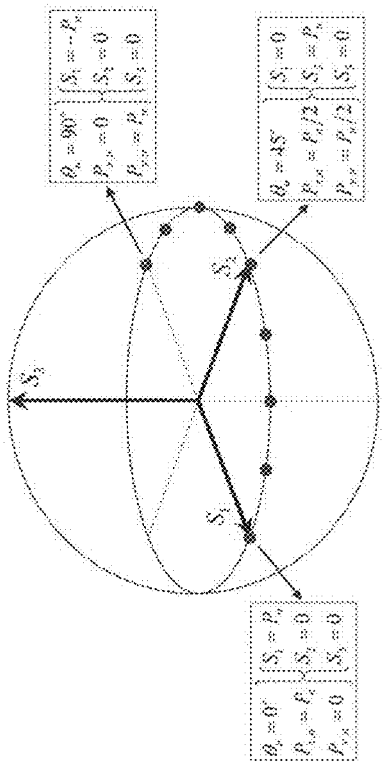
FIG. 4 shows an example of Poincare sphere consistent with an aspect of the present disclosure.

In FC-OTDR signal processing in digital signal processor (DSP) 301, the two parameter domains; (i) power/polarization angle/phase in Eq. (5-10), and (ii) Stokes parameters in Eq. (11-13), can be used equivalently. The mapping between these two parameter domains can be illustrated by considering an example polarization rotation of θn=0°→45°→90° as shown in FIG. 4, which shows an example of a Poincare sphere 400. From all the possible polarization rotation trajectories on Poincare sphere 400, and assuming the SOP is linear during the rotation, i.e. φx,n=φy,n and S3=0, the Rx signal SOP variation range is located on the S1-S2 plane of the Poincare sphere, as illustrated by the blue points in FIG. 4. When θn=0, the entire tone power is in the x-polarization, i.e. Px,n=Pn and Py,n=0. This point is mapped to Stokes coordinates of (S1,S2,S3)=(Pn,0,0). By rotating the polarization angle to θn=45°, the tone power is equally divided between the x- and y-polarization, i.e. Px,n=Pn/2 and Py,n=Pn/2, and the corresponding Stokes coordinates are (S1,S2,S3)=(0,Pn,0). By further rotating the polarization angle to θn=90°, the entire tone power is distributed into the y-polarization, i.e. Px,n=0 and Py,n=Pn. The corresponding Stokes coordinates thus become (S1,S2,S3)=(−Pn,0,0).

As described in greater detail below, the FC-OTDR consistent with the present disclosure has different modes of operation depending on the availability of the phase and polarization angle measurement. If the optical phase signal from Eq. (9,10) is available, all the SOP Stokes coordinates (S1,n,S2,n,S3,n) according to Eq. (11-13) can be calculated. This is referred to as "full SOP" measurement. In a measurement scenario where optical phase cannot be extracted, only S1,n from the SOP Stokes coordinates can be calculated. This is referred to as "partial SOP" measurement. Note that both S1,n and polarization angle θn can identify the power exchange variation between x- and y-polarization according to Eq. (11,8), such that these parameters do not require an optical phase measurement. Therefore, in the partial SOP measurement scenario, either θn or S1,n can be equivalently used for FC-OTDR signal processing.

As note above, the tone powers $x_{i,n}$, $x_{q,n}$, $y_{i,n}$, $y_{q,n}$ extracted by tones power extraction circuits 302 in DSP 301, are used by extraction circuit 304, also in DSP 301, to calculate the optical parameters, namely power, polarization angle, phase, and SOP Stokes coordinates, according to Eq. (5-13). These optical parameters are used for intrusion detection and OTDR attenuation vs. distance trace construction. For intrusion detection purpose, these optical parameters are preferably captured and tracked over time with a speed faster than the following:

(i) their background variation, (ii) intrusion induced variation.

In one example, provided that optical parameter capturing and tracking satisfies (i) and (ii), the background variation may be subtracted from the optical parameters profile over time, such that the intrusion induced variation can be identified.

The optical parameter profile over time can be constructed based on each single tone with certain limitations as described below. Based on each single tone, the optical parameters associated to any fiber location $d=d_0$, is only captured once per one OTDR period. The next capture of the optical parameters for $d=d_0$ happens in the next OTDR period. Therefore, by using a single tone, the optical parameters tracking speed for any location $d=d_0$ is 1/OTDR period. This reveals a fundamental limitation of the single tone OTDR operation for enabling SOP and/or optical phase tracking. To clarify this limitation and the reason behind designing the multi-tone operation in the proposed FC-OTDR, consider the following numerical example. Assuming an OTDR period of 1 ms for 100 km FUT measurement range, the corresponding optical parameters tracking speed for single tone OTDR operation will be 1/1 ms=1 kHz. The background variation of the optical phase, by considering a typical COT laser linewidth, can be assumed to be around 100 kHz. Under these conditions, the background optical phase/full SOP cannot be tracked/extracted since its variation speed is faster than the OTDR single tone tracking capability. For the same reason, the background and intrusion induced polarization angle variations faster than 1 kHz cannot be tracked and differentiated.

The proposed FC-OTDR multi-tone operation overcomes the limitations of the single-tone approach to enable full/partial SOP tracking. By generating different tone pulses in one OTDR period, the optical parameters capture rate for any location $d=d_0$ becomes $1/T_{tnd}$, where $T_{tnd}$ is the tone duration. In the simplest FC-OTDR configuration, the time spacing between the tones is zero and number of tones is designed to be Nin-OTDR period/$T_{tnd}$. Therefore, by tuning the tone duration, FC-OTDR can achieve the required capturing rate for full/partial SOP tracking. For example, for an OTDR period=1 ms, $T_{tnd}$=2 μs, and $N_{tn}$=500, the corresponding FC-OTDR capture rate is $1/T_{tnd}$=500 kHz, which can track an optical phase variation speed of 100 kHz and therefore full SOP tracking is achieved. This is based on the assumption of only a few times averaging being required. There are different measurement scenarios in which, although FC-OTDR loses the optical phase/full SOP tracking because of not achieving the required averaging condition, it can still track partial SOP for the purpose of intrusion detection. Refer to Section V for more details.

Figure 5A:
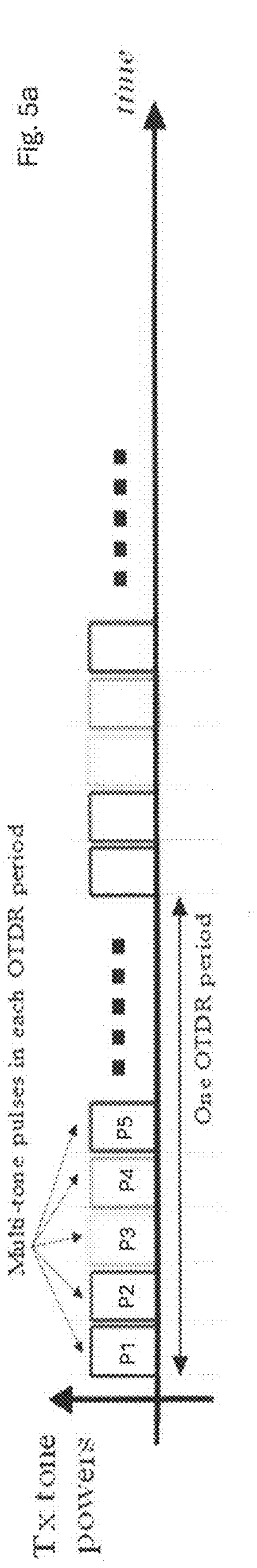
FIG. 5*a* shows an example of transmit tone powers consistent with the present disclosure.
Figure 5B:
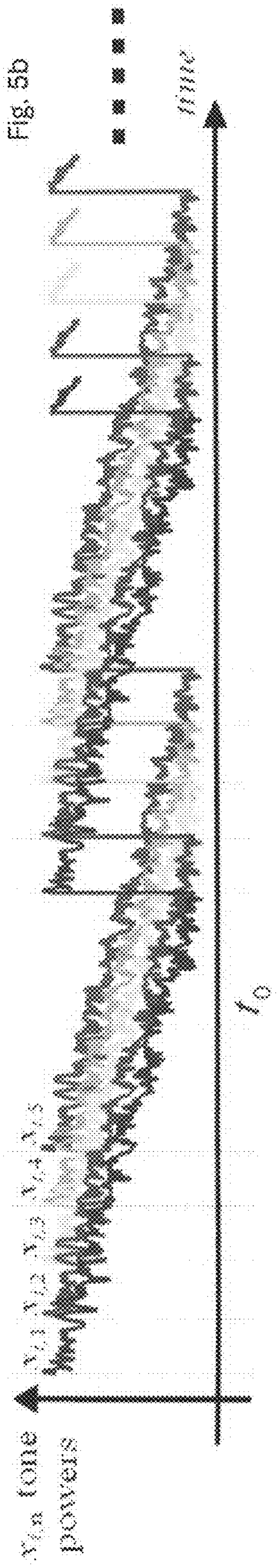
FIG. 5*b* shows an example of received tone power traces consistent with an aspect of the present disclosure.

As mentioned above, for intrusion monitoring at each fiber under test ("FUT") 116 location $d=d_0$, a continuous trace of the variation in optical parameters at $d=d_0$ over time needs to be constructed. For this purpose, the following process should be performed. FIG. 5*a* illustrates the multi-tone pulse powers associated with each of pulses P1 to P5 shown in FIG. 2 and launched at Tx port 110. FIG. 5*b* shows received tone powers at the Rx port 112 for an x/path. Each point of the first tone time-domain trace $x_{i,1}$ (see FIG. 5*b*) is associated pulse P1 with in FIG. 5*a*, in one OTDR period. At time=$t_0$, such trace corresponds to a certain location of the FUT 116 at $d=d_0$, according to the roundtrip time-to-distance mapping relation: $t_0=2d_0/(c/n_g)$, where c is the light speed and $n_g$ is the group refractive index of the fiber. As further shown in FIG. 5*b*, each of traces $x_{i2}$, $x_{i3}$, $x_{i4}$, and $x_{i5}$ is associated with a corresponding on pulses P2 to P5. For most fibers, this relation is approximated as $t_0=d_0\times 10^{-8}$. The same location $d_0$ for trace $x_{i,2}$ corresponds to time=$t_0+T_{tnd}$. This is because second tone pulse P2 is launched with a delay time of $T_{tnd}$ later than the first tone pulse. Therefore, each tone has a corresponding received signal quadrature, e.g. $x_{i,1}$, $x_{i,2}$, $x_{i,3}$, etc., such that each tone has the information from the location $d=d_0$ in different, time slots. The time slots of the various tones are preferably stitched together to construct a continuous profile that varies over time for $d=d_0$. In other words, the raw tone power signals of each received quadrature tone component after time-to-distance mapping are continuous over the FUT distance, i.e. $x_{i,1}(d)$, $x_{i,2}(d)$, $x_{i,3}(d)$, etc. These tones "signal over distance", obtained by the stitching process between all the tones, is converted to a "signal over time" at each distance, i.e. $x_i(t,d=d_0)$.

By inserting the Rx quadrature data over distance into Eq. (5-13), the corresponding optical parameters become data over distance. Let $G_n$ represent all the optical parameter data over distance for each tone n, $$G_n=\{x_{i,n},x_{q,n},y_{i,n},y_{q,n},P_n,P_{x,n},P_{y,n},\theta_n,\varphi_{x,n},\varphi_{y,n},S_{1,n},S_{2,n},S_{3,n}\} \tag{14}$$

and G $(t,d=d_0)$ be the corresponding stitched time-domain signal at $d=d_0$. The stitching between different time slots is performed as in Eq (15):

$$G(t,d=d_0)=\begin{cases} G_1(t) & d_0\times 10^{-8}+0\times T_{tnd}<t<d_0\times 10^{-8}+1\times T_{tnd} \\ G_2(t)+\Delta G_2 & d_0\times 10^{-8}+1\times T_{tnd}<t<d_0\times 10^{-8}+2\times T_{tnd} \\ G_3(t)+\Delta G_3 & d_0\times 10^{-8}+2\times T_{tnd}<t<d_0\times 10^{-8}+3\times T_{tnd} \\ \ldots \end{cases} \tag{15}$$

$$\Delta G_j=G_{j-1}(\text{end})-G_j(0) \tag{16}$$

As expressed in Eq. (16), any signal difference between the consecutive tones is compensated for during the stitching process. In particular, there is a phase offset between the consecutive tones received from each distance according to Eq. (17):

$$\varphi_{n+1}-\varphi_n=\frac{2\pi}{\lambda_n}d_0-\frac{2\pi}{\lambda_{n+1}}d_0=2\pi d_0\left(\frac{1}{\lambda_n}-\frac{1}{\lambda_{n-1}}\right) \tag{17}$$

which Eq. (16) compensates for during the stitching process, where λ is the optical wavelength corresponding to each tone.

Figure 6:
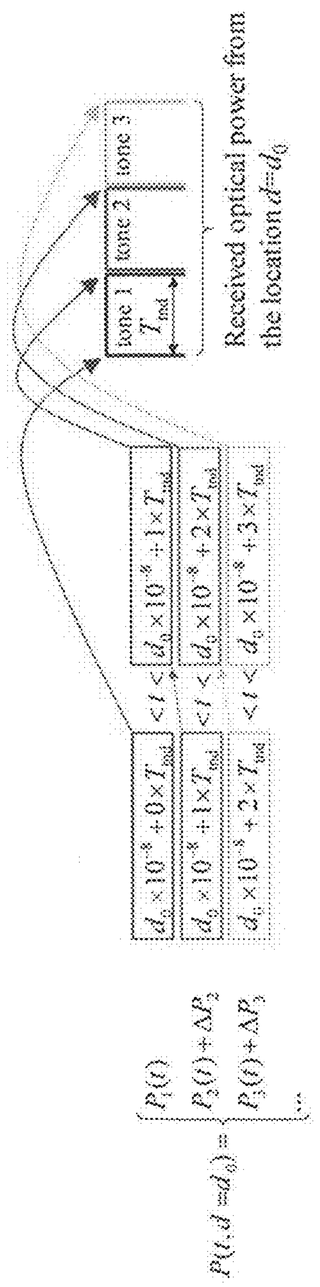
FIG. 6 shows an example of a stitching process consistent with a further aspect of the present disclosure.

FIG. 6 illustrates a stitching process 600 consistent with an aspect of the present disclosure. Namely, as shown in FIG. 6, the different time slots stitching of the sequential tones to construct the continuous time-domain optical power trace at location $d=d_0$; $P(t,d=d_0)$.

By tracking the continuous optical phase at any location d=d0 of a fiber under test 116, the carrier phase is recovered and subtracted out, resulting in a phase value at that location, i.e. φ(d=d0). Either φx,n or φy,n can be used to obtain q (d=d0). Since each transmitted (Tx) tone pulse, e.g., P1 to P5, is running on a single polarization, φx,n or φy,n carry the same phase information with a slight time-shift corresponding to the two polarization (x and y) path skew in the ICR 108. Similarly, with continuous polarization angle and power tracking, the background variation is subtracted out to obtain θ(d=d0) and P(d=d0), respectively. By removing the background variation, these optical parameters, P(d), θ(d) and φ(d), will have a constant profile, over the length of FUT 116 and have no variation over time. They change only if a fiber intrusion is made. If an intrusion occurs at location d=d0, the optical parameters at the longer lengths d>d0 also change. This is because light reflected from d>d0 also experiences the power/polarization/phase change occurring at d=d0. The intrusion location can be identified as the first point where the optical parameter profile changes due to the intrusion. Intrusion detection sensitivity scenarios and examples of intrusion detection based on power and SOP events extraction are described below.

As noted above, FC-OTDR uses three optical parameters for intrusion detection, namely phase φ(d), polarization angle θ(d), and power P(d). These three optical parameters are affected by an intrusion with varying degrees of sensitivity. Namely, optical phase and power are the most and least sensitive, respectively, to an intrusion. A more sensitive optical parameter can be used to identify less intensive intrusions. However, the time-domain tracking of the more sensitive parameters is more difficult to process in light of noise/averaging requirements. The measurement noise/averaging requirements show which of the three time-domain optical parameter trackings are achievable for different FUT distances and/or reflected power levels. Three optical parameter tracking scenarios will next be described, each associated with a corresponding intrusion detection sensitivity level.

Optical phase tracking process, i.e. full SOP tracking, is the most sensitive operation. mode. In the absence of optical phase tracking, polarization angle tracking, i.e. partial SOP tracking, is the next less sensitive operation mode. As discussed above, polarization angle tracking does not require optical phase information and is extracted based on x- and y-polarization powers expressed in Eq. (6-8). In the absence of both optical phase and polarization angle tracking, only power tracking, the least intrusion sensitive operation mode, is available. The three sensitivity level operation modes will be referred to herein as high, medium and low intrusion sensitive (HIS, MIS and LIS, respectively) modes. The technical bases for each FC-OTDR sensitivity level will next be described for different FUT measurement scenarios.

Depending on the received optical power level at the Rx port 112 and the photodetection responsivity of the BPDs, different averaging time windows, Δtavg, over the received consecutive tones and over several OTDR periods is necessary for intrusion detection based on the optical phase, polarization angle and power tracking processes. The background optical phase variation speed is proportional to the linewidth of light output from laser 104 and background polarization variation resulting from the overall temperature, stretch and vibration change along the fiber. Therefore, background optical phase varies faster over time than the background polarization angle. At a certain fiber location d=d0, if the SNR is not sufficient for a stable measurement, the Δtavg should increase, which may extend beyond the optical phase variation cycle. Accordingly, optical phase tracking, i.e. in the HIS mode, is more likely to be lost than the polarization angle tracking, i.e. in the MIS mode. For a low SNR scenario, by further increasing Δtavg, polarization angle tracking may also be lost and eventually power tracking, i.e. the LIS mode, becomes the only available mode. Therefore, HIS, MIS and LIS operation modes may be required due to the SNR present in different FUT distances and/or reflected power levels.

Improved intrusion detection associated with FC-OTDR disclosed herein will next be described by way of a comparison conventional SC-OTDR. In particular, a numerical example is presented below with intrusion detection that is based on an instantaneous power change event extraction in FC-OTDR and compared with intrusion detection based on the traditional SC-OTDR approach. Assume two SC-OTDR and FC-OTDR measurements with the following parameters: Ttnd=10 μs, OTDR period=10 ms for 1000 km FUT measurement range, an average of 6000 traces are generated for the required SNR, and an intrusion-induced power change event lasting for a duration of 60 ms occurring at a location d=d0. See FIG. 7. The OTDR power traces 702 and 704 are captured and are averaged and normalized to be expressed as attenuation, i.e. Att(dB), versus FUT distance, i.e. d(km), see plots 706 and 708.

Figure 7:
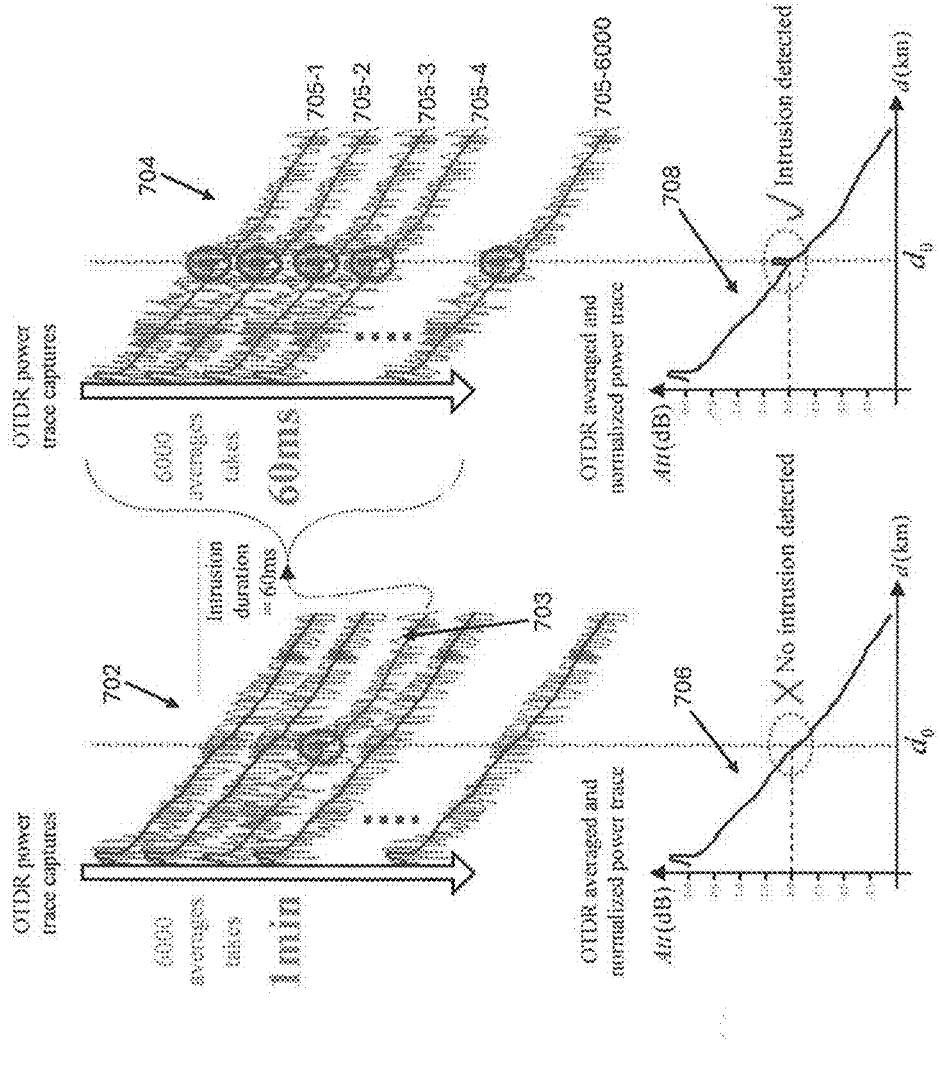
FIG. 7 shows various plots of OTDR power trace captures and averaged and normalized power traces consistent with an aspect of the present disclosure.

As further shown in FIG. 7, the conventional SC-OTDR takes 1 minute to capture 6000 traces. Only five out of 6000 traces have the power change event signature buried within the power noise as shown by trace 703. Note that only 1 out of 5 traces having the signature is illustrated. During the averaging process, the power change event signature is averaged out and therefore cannot be detected. In the FC-OTDR approach, 6000 traces are captured in 60 ms. Each such trace has the power change event signature identifiable within power traces 705-1 to 705-6000. Therefore, the power change event signature is preserved after the averaging process. As a result, ultrafast time domain averaging is realized based on FC-OTDR multi-tone operation to enable accurate intrusion detection by way of instant power change extraction.

Figure 8B:
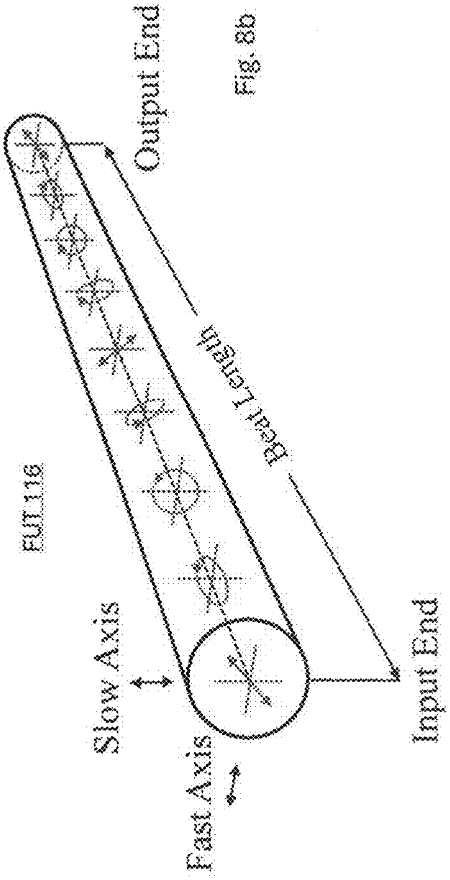
FIG. 8*b* shows an example of a length of fiber having fast and slow axes.
Figure 8D:
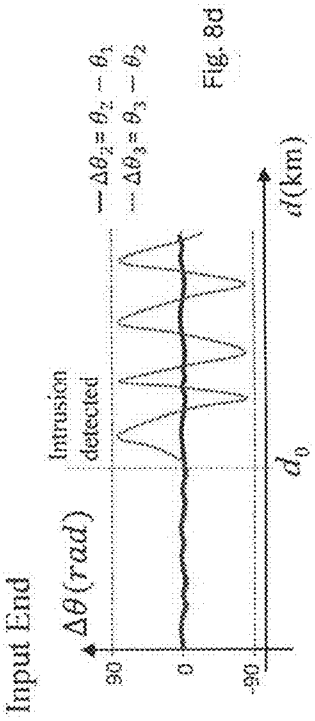
FIGS. 8*c* and 8*d* show example so changes in state of polarization (SOP) angle vs. distance along a length of optical fiber.
Figure 8A:
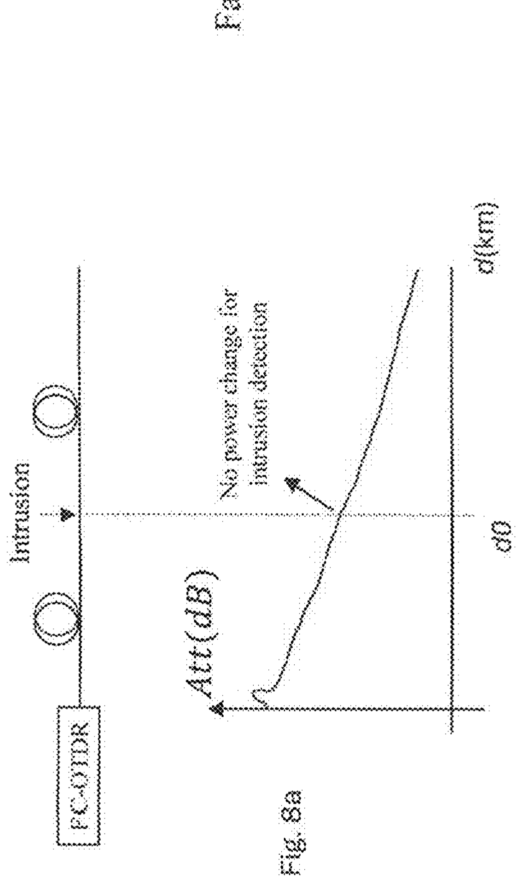
FIG. 8*a* is a plot of attenuation vs. distance along an optical fiber.
Figure 8C:
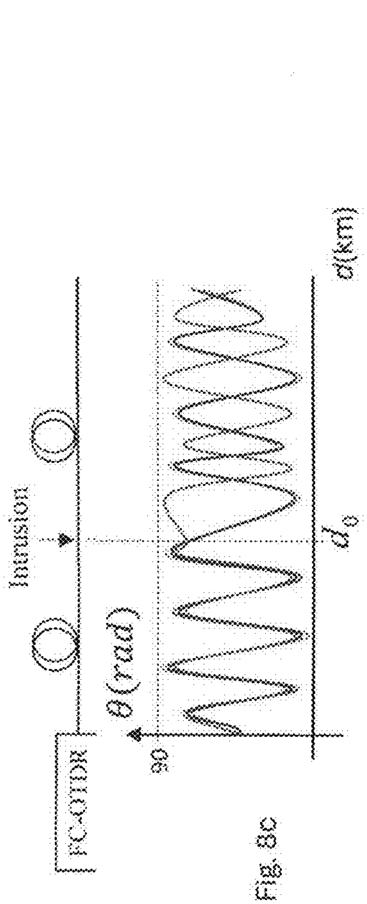

In addition to the power trace, i.e. attenuation, Att(dB) vs. d(km) shown in FIG. 8*a*, FC-OTDR extracts full/partial SOP over time at each FUT distance as shown in FIG. 8*c*. For ease of explanation, the SOP Stokes parameters, S1, S2, and S3, are not shown since their variation profiles would be similar to the SOP polarization angle θ shown in FIG. 8*c*. After subtracting/removing the background polarization variation, the polarization angle will be a constant profile over the fiber length as shown with θ1 in FIG. 8*c*. The oscillatory shape of θ(rad) vs d(km) is due to the SOP evolution during propagation along a beat length of FUT 116 extending between an input end and output end of the fiber (see FIG. 8*b*). The SOP varies during propagation, in this example, due to the fast and slow axes of the fiber. With no intrusion applied to the fiber, the next captured θ(rad) vs d(km) trace, θ2 in FIG. 8*c*, is similar and close to θ1. Therefore, the Δθ2=θ2−θ1 profile will almost be zero as shown in FIG. 8*d*. By applying an intrusion at d=d0, the θ profile starting from d>d0 will change, as shown with θ3 in FIG. 8*c*. Accordingly, Δθ3=θ3−θ2 will have a measurable oscillation value starting from d>d0. Hence, by processing the Δθ trace and extracting the first point where the polarization angle profile changes due to an intrusion, the intrusion location can be identified. Note that as mentioned above, partial/full SOP tracking, i.e. the MIS/HIS modes, are more sensitive than power tracking, i.e. the LIS mode, for intrusion detection. Therefore, for a low magnitude intrusion occurrence scenario, although there may be no power change signature for intrusion detection, as shown in FIG. 8*a*, SOP variation patterns can detect the intrusion, as shown in FIGS. 8*c* and *d*.

The foregoing disclosure provides illustration and description, but is not intended to be exhaustive or to limit the implementations to the precise forms disclosed. Modifications may be made in light of the above disclosure or may be acquired from practice of the implementations.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical time-domain reflectometry (OTDR) system, comprising:

a coherent optical transceiver configured to:
- generate a multi-tone optical signal via a coherent modulator;
- transmit the multi-tone optical signal through a transmission port into a fiber under test;
- receive a backscattered optical signal from the fiber under test through a reception port; and an intradyne coherent receiver coupled to the reception port, configured to:
- split the backscattered optical signal into two orthogonal polarization components;
- convert each polarization component into electrical in-phase and quadrature components via balanced photodiodes; and
- digitize the electrical in-phase and quadrature components for signal processing including ultra-fast averaging to detect intrusions within the fiber under test;

wherein the intradyne coherent receiver includes a signal extraction circuit configured to process signals to derive electric field amplitude, polarization angle, and optical phase from the backscattered optical signal.

2. The OTDR system of claim 1, further comprising an optical circulator directing the multi-tone optical signal through the fiber under test and the backscattered optical signal to the intradyne coherent receiver.

3. The OTDR system of claim 1, wherein the coherent modulator is configured to modulate the optical signal with multiple tones utilizing a nested Mach-Zehnder modulator.

4. The OTDR system of claim 1, wherein the coherent optical transceiver includes a laser generating an initial optical signal for modulation.

5. The OTDR system of claim 1, wherein the intradyne coherent receiver comprises a polarization beam splitter configured to split the received backscattered optical signal.

6. The OTDR system of claim 1, wherein the backscattered optical signal contains information pertaining to disturbances within the fiber under test indicative of intrusions.

7. The OTDR system of claim 1, wherein the intradyne coherent receiver is configured to perform signal decomposition to extract full optical phase and state of polarization information from the backscattered optical signal.

8. The OTDR system of claim 1, wherein the balanced photodiodes are configured to process the backscattered optical signal based on a predetermined optical tone period associated with intrusion detection.

9. The OTDR system of claim 1, wherein the intradyne coherent receiver includes analog to digital converters to digitize in-phase and quadrature components of the electrical signals from the balanced photodiodes.

10. The OTDR system of claim 1, further comprising a signal processing circuit configured to process digitized signals to construct a continuous time-domain profile pertaining to the fiber under test for intrusion localization.

11. The OTDR system of claim 1, wherein the digitized signals are processed to extract instantaneous power, polarization, and phase changes over the fiber under test.

12. The OTDR system of claim 1, wherein the intradyne coherent receiver uses tone power extraction circuitry to extract power of each tone from the backscattered optical signal.

13. The OTDR system of claim 1, wherein the coherent optical transceiver and the intradyne coherent receiver are configured to process the multi-tone optical signal and the backscattered optical signal with a high-speed averaging process to enable real-time detection of intrusions within the fiber under test.

14. The OTDR system of claim 1, wherein the system is operable across an optical fiber span length of up to 100 kilometers, and capable of constructing a real-time trace within 60 milliseconds for intrusion detection.

* * * * *